Sept. 17, 1935.  F. N. BARD  2,014,463
LUBRICATED PLUG VALVE
Original Filed Dec. 31, 1927  2 Sheets-Sheet 2
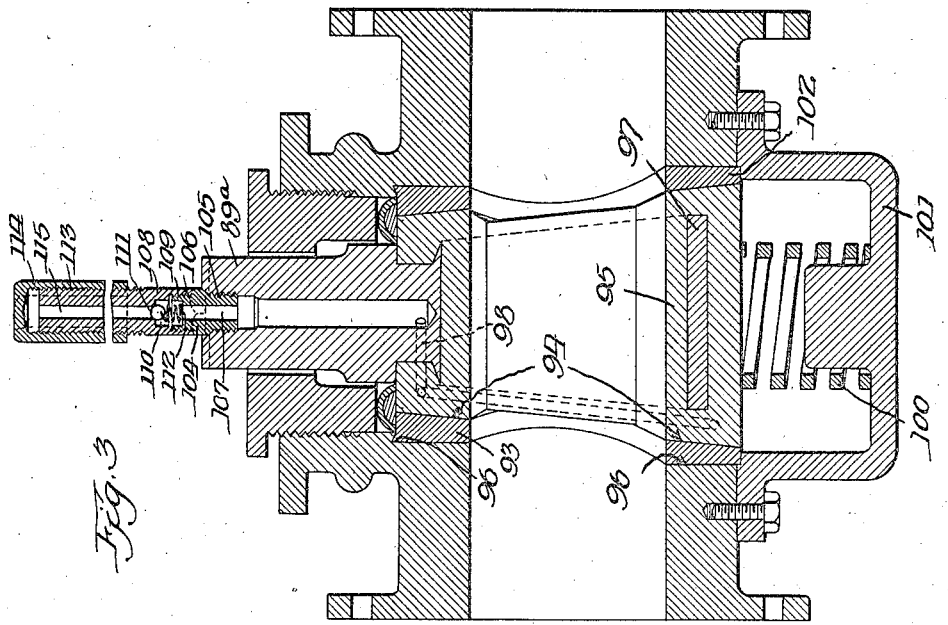
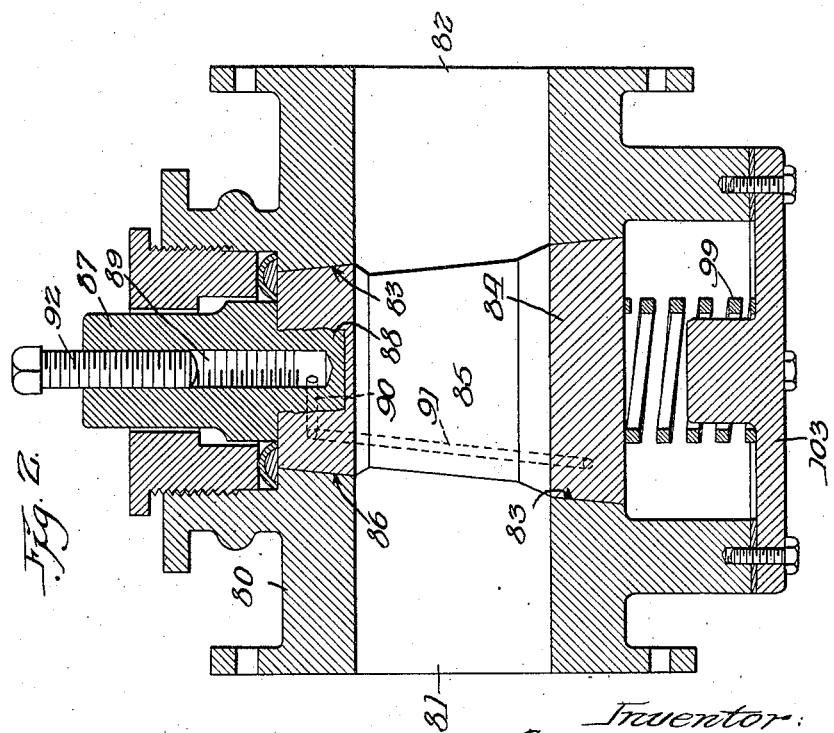

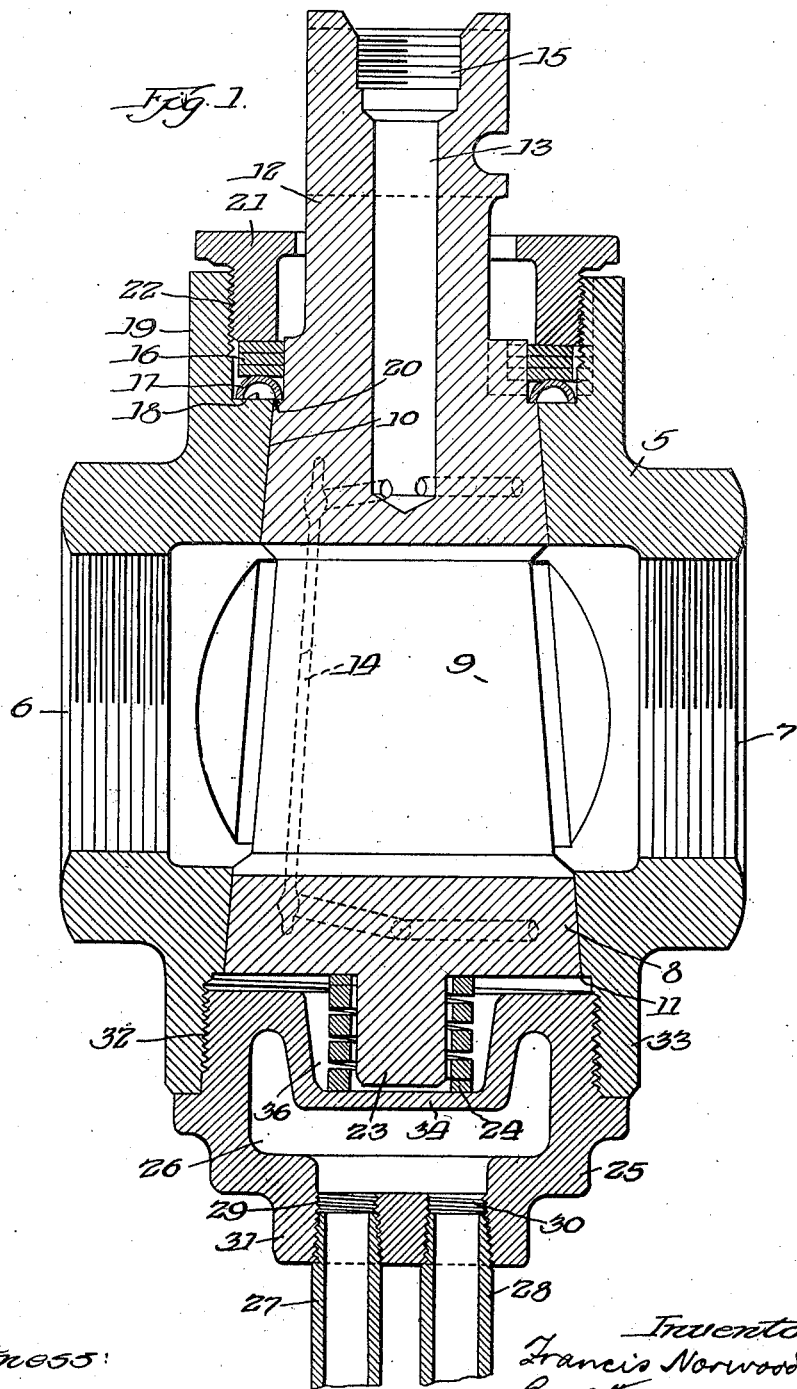

Patented Sept. 17, 1935

2,014,463

UNITED STATES PATENT OFFICE 2,014,463

LUBRICATED PLUG VALVE

Francis Norwood Bard, Highland Park, Ill., assignor to Walworth Patents, Inc., Boston, Mass., a corporation of Massachusetts Original application December 31, 1927, Serial No. 243,994. Divided and this application July 15, 1932, Serial No. 622,711

3 Claims. (Cl. 251—91)

This invention relates, in general, to valves and, in particular, to an improved means for maintaining the temperature of the valve at a degree which will prevent freezing or other clogging of the valve due to solidifying or congealing of a fluid flowing therethrough or contained therein.

This invention further contemplates the provisions of a plug valve wherein the plug member is formed of material different than that of the casing and seat, in the present instance, preferably non-metallic and particularly of the condensation product known as bakelite, whereby the plug will not be readily affected by heat.

The invention also contemplates the provision of a plug valve wherein both the plug member and the seat are constructed of non-metallic material, while, however, the valve stem or a core and the casing and the lubricating structure, if employed, of the plug may be formed of metal.

While, for convenience in describing the invention, it is shown embodied in two structures for association with plug valves, particularly lubricated plug valves, it will be understood that the invention is equally well adapted to valves of other types and to other analogous purposes and therefore finds a wide field of utility.

The principal objects and advantages of this invention are to provide an improved means for maintaining free flow of a liquid through a valve, particularly one of the rotating plug type, such, for instance, in installations wherein tar or other heavy fluids or liquids are conducted; the provision of an improved means for maintaining a desired viscosity of a fluid while passing through a valve; the provision of an improved heating means for a valve, or the like, readily applicable to the valve structure without material alteration therein; the provision of an improved means of the character described which is detachably mounted on the valve, or the like, to facilitate repair and replacement and, in certain respects, the provision of a device of this character which may be substituted for existing parts of the valve structure so as to be applicable to valves not originally equipped with such a heating element.

As a further object of this invention, I provide a plug valve having, in the one instance, a metallic valve seat and a non-metallic plug member, and, in the other instance, having both a non-metallic plug member and seat, that is, the contacting surfaces are non-metallic while the core of the plug member and the casing of the valve may be formed of metal or of some other material suitable for the purpose, the object being to provide a material in the plug valve and casing which is not readily affected by heat or by acids or caustic solutions.

This application is a division of my application S. N. 243,994, filed December 31, 1927, now Patent 1,888,207, granted November 22, 1932.

The foregoing and such other objects and advantages as may appear or be pointed out as this description proceeds are attained in the structural embodiments of the present invention illustrated in the accompanying drawings in which:

Figure 1 is a vertical sectional view through a rotating plug valve embodying the improvements of my invention.

Figures 2 and 3 are, respectively, vertical sectional views of alternative forms of the present invention.

Referring now more particularly and first to Figure 1 which represents what may be for some purposes a preferred form of the invention, I have illustrated a plug valve casing or housing 5 provided with the conventional threaded inlet opening 6 and outlet opening 7 which are placed in communication with each other by rotation of a plug valve member 8, the latter being generally tapered in configuration and having a transverse bore 9 which establishes communication between the openings 6 and 7 when brought into alignment therewith. The tapered plug valve 8 is inserted into the casing, and, in the present instance, the bottom thereof engages a complemental valve seat 10 provided in the casing. The bottom of the casing, as viewed in Figure 1, is open, as at 11, to receive the plug valve member, and the upper end of the casing above the seat 10 is open to accommodate passage therethrough of the valve stem 12 which latter is constructed to provide a lubricant chamber 13 having communication with external grooves 14 either on the surface of the plug valve member or on the seat 10, or both, as desired. Suitable means, not shown, is provided in the chamber 13 in engagement with the threaded portions 15 thereof, for placing the lubricant in the chamber 13 and grooves 14 under pressure for lubricating the valve.

A suitable packing, including the packing material 16 and an expansive washer 17, is provided between a shoulder 18 on the extension 19 of the casing 5 and a complemental shoulder 20 on the valve stem, a packing gland 21 having threaded engagement at 22 with the extension 19 serving to compress said packing and washer.

In the usual form of rotating plug valve, either of the lubricated or non-lubricated type, it is not unusual to maintain the valve on its seat by the provision of a yieldingly resistant element held in place by a removable plug threaded into the opening 11. It will be observed in Figure 1 that an axial extension 23 is provided on the lower larger end of the plug valve 8, and a helical spring 24 surrounds said extension 23.

In this form of my invention I substitute for the conventional closing plug a heat jacket or chamber element 25 which latter is formed with a pocket 26 having communication with a source of heating fluid such as steam by the provision of supply and return pipes 27 and 28 threaded into openings 29 and 30 in the outer wall 31 of said jacket member. The jacket member is in threaded engagement at 32 with the opening 11 by virtue of the usual threads provided on the inside of the extension 33 of the casing 5. The inner wall 34 of the jacket 25 is formed with a depression at its central portion affording a recess 36 for reception of the extension 23 and spring 24.

It will be observed that in the operation of this form of the invention the heat applied to the jacket 25 by steam or other heating fluid is transmitted to the lower end of the plug valve member, in turn heating the latter and thereby maintaining both the fluid passing through the valve, and any lubricant employed in the grooves 14 and chamber 13, at a temperature such as will permit of operation of the valve at any time desired. I lay particular stress on the fact that the construction of the jacket wherein the steam is walled off from the contents of the valve prevents "foaming" of the contents of the valve, due to the steam coming in direct contact therewith. This is particularly advantageous where tar and similar highly viscous fluids are conducted.

The form of this invention serves to attain a function which is not heretofore known to others in that it will properly heat a tapered plug valve so that unequal expansion and contraction of the valve parts, that is, the seat and the valve member, does not occur in this form of the invention. In some installations for some purposes the form of the invention shown in Figure 1 may be employed and overcomes the difficulty heretofore, which has been that when applying heat to the valve member, an unequal expansion of the valve member and its seat sometimes takes place, which causes the valve member to jam and renders it practically impossible of rotation, or to cause unequal expansion of the casing and seat, which causes the valve to leak. In my invention the heating jacket 25 is applied to present the heating medium at one end of the valve so that the greatest area of exposed end surface of the valve member receives the greatest heat. The advantage of this is that, in 90% of plug valves in practical use, whether lubricated or not, the smaller end of the plug appears to receive the greatest wear, for reasons which are not accurately known, which would appear to indicate that, if heat were applied to the smaller end of the plug member, it would so expand this end with respect to the valve seat and the rest of the valve member as to render impracticable the application of heat because of expanding the valve and preventing it from rotating in its seat. This is probably due to the fact that the heat is not dissipated equally enough from the smaller end, and, in any event, becomes less in quantity per area of surface to which it is applied, which results in the smaller end of the plug member being more greatly expanded than the rest of the plug, which, as pointed out, is undesirable.

In my invention the heat is applied to that end of the plug which has the greatest available end surface for this purpose, and this is true whether the stem comes out of the larger or smaller end of the plug, as the case may be. The application of the heat to the plug in this manner permits of a distribution of the heat into the plug member and its seat substantially uniformly in spite of the tapering configuration of the plug, so that, as the heat dissipates as it passes through the plug, the amount of surface to which the reduced heat must be applied is proportionately reduced.

Referring now to Figure 2, an alternative form of this invention, it will be observed that I provide the usual casing 80 having passageways 81 and 82 therein, the casing shown in Figure 2 being metallic and formed with a valve seat 83 on which a plug valve member 84 is adapted to engage.

The plug valve member in Figure 2 is non-metallic and preferably formed of a phenol condensation product known as bakelite, the valve having a transverse passageway 85 and provided with tapering surface 86 which engages the seat 83.

In view of the difficulty in forming the valve 84 with threads, etc. required at the upper end, I provide a metallic stem 87 which is provided with a roughened or serrated lower extremity 88 around which the plug valve member is moulded, the stem and plug valve made thus being firmly secured together.

For lubricating purposes, as hereinbefore explained in connection with Figure 1, I provide a lubricant chamber 89 and communicating passageway 90 and groove 91 for supplying lubricant from the chamber 89 to the seating surface of the valve and its seat under pressure created by screw 92.

Referring now to the further alternative form of the invention shown in Figure 3, I provide a casing similarly to that shown in Figure 2, with the exception that the valve seat is non-metallic as well as the plug valve member. In this instance, the valve seat is a separate non-metallic portion formed preferably of bakelite indicated at 93 and having a seating surface 94 against which the plug valve member 95 is adapted to engage. The casing is provided with suitable recesses as at 96, 96, and the valve seat is cast in said recesses and later ground as desired.

In the form of the invention shown in Figure 3, the plug valve member 95 is cast around a yoke-like core 97, formed preferably of metal and having a lubricant chamber 89a communicating by passages 98 and grooves 91a to the seating surface of the valve and its seat.

In both of the forms of the invention shown in Figures 2 and 3, it will be obvious that any other non-metallic material suitable for the purpose may be employed for the valve and its seat, but I prefer bakelite owing to its resistance to distortion in the presence of heat and due to its resistance to premature deterioration by the action of acid and caustic solutions. It will be also understood that any other convenient manner of forming the plug member and the seat on their respective parts, that is the stem and the casing may be resorted to without departure from the spirit of this invention.

In the form of the invention shown in Figure 3, in order to facilitate replacement if desired, of the bakelite valve seat, the bottom cap member 101 is provided with a shoulder 102 which abuts the lower end of the valve seat member so that this member may be removed, if desired, by removing the cap 101. It will be obvious that the cap 101 and the cap 102 in Figure 2 may be constructed with steam chambers similarly to the cap shown in Figure 1.

As an alternative form of compressor and for purpose of providing the means for containing a larger amount of lubricant, where desired, I provide the grease cup member shown at the top of Figure 3. This device includes a nipple 104 having threaded portions 105 and 106. The bore 107 of the nipple 104 communicates with the lubricant chamber 89a and is in threaded engagement with the valve stem, as shown.

The outer end of the nipple 104 is threaded into the lower end of the tubular lower portion 108 of the grease cup. Complemental recesses 109 and 110 are formed in the adjacent ends of the nipple 104 and tubular member 108 in order to afford a chamber for receiving a ball check valve 111 maintained upwardly on its seat by a helical spring 112. The check valve prevents reflex of lubricant from the lubricant chamber 89a, as will be obvious.

The tubular member 108 is externally threaded, as at 113, to receive a cap member 114. The cap member 114 is adapted to contain grease which is, as said cap is screwed downwardly, caused to be forced through the bore 115 past the check valve 111 and into the lubricant chamber 89a, continued motion of the cap 114 compressing the grease both in the grease cup and in the lubricant chambers, and passageways of the valve.

Having thus described my invention and illustrated its use, what I claim as new, and desire to secure by Letters Patent is:

1. The combination with a lubricated plug valve having a casing provided with a tapered valve seat and tapered valve member engaging said seat, of means for applying heat to the large end of said valve member, said means comprising a separable cup-shaped member engaging the casing adjacent the large end of the valve member and having a hollow core and means in the outer wall of said member to admit heating fluid to the core for heating the valve member by conduction through the inner wall of said member.

2. The combination with a lubricated plug valve having a casing provided with a tapered valve seat and a tapered valve member engaging said seat, said casing having a projecting portion thereon extending beyond the large end of the valve member, of means for applying heat to the large end of said valve member, said means comprising a separable cup-shaped member engaging said projecting portion and enclosing the adjacent end of the casing, said member having a hollow core forming inner and outer walls thereon, a boss on said outer wall having inlet and outlet apertures therein communicating with said core, and means connected with said apertures to circulate heating fluid in said core for heating the valve member by conduction through said inner wall.

3. The combination with a lubricated plug valve having a casing provided with a tapered valve seat and a tapered valve member engaging said seat, said casing having a projecting portion thereon extending beyond the large end of the valve member, of means for applying heat to the large end of said valve member, said means comprising a separable cup-shaped member threadedly engaging said projecting portion and enclosing the adjacent end of the casing, said member having a hollow core eccentric with respect to the exterior surfaces thereof and forming an inner wall on said member of thinner cross-section than the outer wall and having inlet and outlet apertures therein communicating with said core, and conduit means connected to said apertures to circulate heating fluid in said core for heating the valve member by conduction through said inner wall.

FRANCIS NORWOOD BARD.